United States Patent Office 3,475,404
Patented Oct. 28, 1969

3,475,404
METHOD OF PREPARING PROTEINACEOUS MATERIAL WHICH COMPRISES HEATING AN AQUEOUS SOLUTION OF COLLAGEN-CONTAINING MATERIAL AT A TEMPERATURE IN THE RANGE OF 250° F.–350° F. AND THEN TREATING THE SOLUTION WITH ANION EXCHANGE RESINS
Vernon L. Johnsen, La Grange, and Eugene V. Matern and Raymond S. Burnett, Chicago, Ill., assignors, by mesne assignments, to Wilson Pharmaceutical & Chemical Corporation, Chicago, Ill., a corporation of Delaware
No Drawing. Continuation-in-part of application Ser. No. 301,970, Aug. 14, 1963. This application Aug. 25, 1966, Ser. No. 574,942
Int. Cl. C07g 7/00; C08h 7/04, 7/02
U.S. Cl. 260—123.7                                    6 Claims

ABSTRACT OF THE DISCLOSURE

The method of preparing light colored water soluble proteinaceous material involves the steps of heating an aqueous solution of collagen-containing material in the presence of sulfite ion to a temperature in the range of 250° F. to 350° F. whereby the gel-forming character of the product is at least partially destroyed and treating the resultant aqueous solution with anion exchange material to remove sulfite ions and precursors for color which precursors, if not removed, make their presence apparent upon dehydration by heat.

---

This application is a continuation-in-part of our application Ser. No. 301,970, entitled Proteinaceous Food Material and Method of Preparing Same, now abandoned.

This invention relates to proteinaceous material derived from collagen-containing materials, and to the method of making same. More particularly, it relates to a type of proteinaceous material having properties giving it utility in the food, cosmetic, and pharamaceutical fields, and the like. Still more particularly, it relates to a proteinaceous food product having foaming properties.

In accordance with this invention, collagen-containing material is treated in aqueous solution under conditions to destroy the gelling character of the proteins, in the presence of a sulfite agent which treatment minimizes development of color and odor during solubilization and heating and results in production of substantially color-less soluble protein components which, in the absence of sulfite ion as when sulfite is destroyed by oxidation to eliminate its objectionable flavor, will be altered during any subsequent heating step into objectionable color bodies, removing the components convertible to color bodies by heat through contact of the solution with ion exchange material of at least anion exchange character and subsequently dehydrating the effluent recovered from the ion exchange treatments using heat.

In order to be useful for incorporation in food, cosmetic, and pharmaceutical products, it is generally desirable that a protein additive be low in color, have a low ash or salt content and be bland with regard to flavor and odor. Collagen can be, and ordinarily is, hydrolyzed to gelatin under extremely mild conditions, so that the gelatin is low in color and is capable of producing water solutions which are viscous and have the power to form strong gels at relatively low concentrations. High viscosity and gel forming ability are properties which can interfere with the development of foam and result in products with undesirable texture and other physical characteristics, i.e., in the manufacture of aerated confectionery products, such as frappes, nougats, etc. In some cosmetic uses relatively high concentrations of protein are used in a liquid preparation. At these concentrations and at relatively low temperatures gelation can occur, which is undesirable.

Proteinaceous products similar chemically to gelatin but with gelling character reduced or largely destroyed, can be obtained by subjecting collagen or derived gelatin to high temperatures and pressures in the presence of steam and/or water. Treatment under these conditions is disadvantageous because the resulting solution of proteinaceous material is rendered dark in color and is possessed of an objectionable odor. One conventional method of eliminating the color from a solution of proteinaceous material is to bleach the aqueous solution of product using hydrogen peroxide. While this treatment removes color from the solution, upon dehydration of the peroxide treated solution using heat, the solid product obtained has an undesirable odor and flavor and solutions of powdered product dehydrated using heat exhibit an objectionally dark color.

Proteinaceous material of non-gelling character as hereafter used means materials which are devoid of gelling character or are of reduced gelling ability. Processing of collagen directly to a non-gelling material is less costly due to the elimination of ordinary gelatin preparation steps. Usually, the non-gelling proteinaceous derivative is prepared in one step by subjecting the raw material to high temperatures and pressures in an aqueous system. The disadvantages of the one-step system are that the resultant non-gelling proteinaceous materials usually have a more objectionable odor and are too dark in color for many applications.

We have discovered that the presence of sulfite radical in solution during high-temperature treatment of proteinaceous material to impart non-gelling or reduced gelling character, inhibits development of appreciable color during the processing and that components capable of changing into odor bodies upon subsequent heating in the absence of sulfite ion, such odor and flavor components including residual sulfite taste, which remain in the heat-treated proteinaceous material can be substantially eliminated by contact of the solution of non-gelling proteinaceous material with ion exchange materials. If desired, the products of this invention may be further processed, as by treatment with enzymes, to adapt them to special uses in the cosmetic industry, in pharmaceutical or bacteriological applications where a peptone with a high degree of clarity and light color would be advantageous, or in acid or alkaline cleaning solutions where inhibition of metal dissolution is required.

In accordance with the present invention, proteinaceous material from hydrolyzed protein obtained through treatment of collagen-containing material with heat and water, is subjected to treatment with aqueous solution containing sulfite ion at elevated temperatures and pressures to produce a solution of proteinaceous material of at least reduced gel-forming character and the solution free of insoluble solids is contacted with anion exchange resins to produce a final aqueous solution of proteins substantially free of sulfite ions and materials convertible to color bodies by heat of the magnitude utilized in conventional drying operations and recovering the proteinaceous product of bland flavor and light color.

When the proteinaceous product is to be derived directly from collagen and associated proteins found in such sources as bones, skins, hides, sinews, fatty tissues and the like, by subjecting them to high temperatures and pressures with steam and/or water, reduction of the proteins to water soluble condition and reduction of the gelling ability of the proteins by heating in the presence of sufficient sulfite ion to minimize development of color, may be carried out in a single heating operation or one in which there is a partial solubilizing in the absence of sulfite ion followed by complete solubilizing and/or elimination of gelling character while heating in the presence of sufficient sulfite ion to minimize development of color.

Sulfite ion may be introduced into the aqueous solution of proteinaceous material by dissolving sulfur dioxide gas in the water to form sulfurous acid, by adding water soluble salts of sulfurous acid, and equivalent operations. The amount of sulfite ion required will vary with the magnitude of the heat treatment and the type of equipment utilized for the cooking operation. Sufficient sulfite must be present so that at least 1000 p.p.m., preferably 2000 p.p.m. (based on solids in solution), remain after the cooking operation to assure obtaining a light colored product. Other conditions being equal, the higher the temperature and the longer the time of heating, the larger the amount of sulfite required. Generally, an amount of sulfite agent is added which is capable of introducing into the solution between 0.1% and 5% of sulfite, i.e., $SO_3$ ion on a weight of the solids in solution basis.

Conditions of processing or the type of equipment used will govern the choice of the sulfite agent. Sulfur dioxide, which dissolves in an aqueous solution to form sulfurous acid may be used advantageously in jacketed pressure vessels that are not heated by direct steam because $SO_2$ introduction does not involve the introduction of ash forming cations. When vessels are used which are heated and pressurized by passing steam directly into the mixture, use of sulfur dioxide gas is uneconomic due to loss in the continuously vented gases. When the solutions of proteinaceous matter are to be heated in vented vessels, the common salts of sulfurous acid such as sodium sulfite, potassium sulfite, sodium bisulfite, potassium bisulfite and mixtures thereof are utilized because of their greater stability under the conditions of the pressure cooking.

For some specific food uses, a low ash and especially a low sodium content proteinaceous material is required. If such product properties are to be met, use of sodium and potassium salts of sulfurous acid as a source of sulfite is not desirable because these salts or their soluble decomposition products would be contained in the finished product unless steps are taken to eliminate cations and anions. If sulfur dioxide gas cannot be used, then salts such as calcium and magnesium bisulfite are preferred for the introduction of sulfite ion because these salts are converted to water insoluble salts or to water-insoluble sulfites or sulfates during the processing, most of which materials can be removed by settling, filtration, etc.

The extent of the heat treatment required to eliminate the gelling characteristic of the proteinaceous material will vary with the type of collagen-containing raw material and with the type of end product desired. A product with virtually no gel strength can be obtained from most collagenous materials by cooking at 35 pounds to 65 pounds gauge steam pressure, i.e., at temperatures in the range between about 275° F. and 310° F., for from 2 to 5 hours.

More in detail, the process of producing a non-gelling proteinaceous product from collagenous material, may consist of an aqueous leach prior to heating or cooking, heating the collagenous material in an aqueous medium such as water or dilute acid at temperatures in the range between about 250° F. and 350° F. in the presence of between 0.1% and 1.5% of sulfite ion on a solids content of the solution basis, separating water solution and substantially all of the insoluble solids and fat, concentrating the water solution to a solids content in the range between about 20% and 40%, separating insoluble solids and a clear concentrate, contacting the clear concentrate with material containing groups capable of ion exchange, i.e., anion exchange alone or cation and anion exchange together irrespective of the order of treatment, adjusting the hydrogen ion concentration following ion exchange of the ion exchanged concentrate to produce a relatively neutral product, i.e., a pH in the range between about 4.5 and 7. The concentrate is then dried.

The collagen containing raw materials may contain naturally occurring soluble salts such as sodium chloride, potassium chloride, etc. in the tissue fluids which salts may be carried through in the process to the finished product. We have found that most of the natural occurring soluble salts can be removed and a non-gelling proteinaceous product of lower ash or lower sodium content produced by steeping the raw material in an aqueous medium. The leaching of the salts is facilitated by reducing the particle size of the raw materials being treated, as by comminuting. A small amount of sulfurous acid in the steep-water is effective in preventing bacterial growth during the steeping operation.

Proteinaceous material produced by a process involving an acid steep tend to exhibit greater freedom from turbidity when the solutions thereof are adjusted to or introduced into solution where a pH is maintained within the range of about 1.5 to about 2.5. Bone free collagenous material may be steeped in solutions of mineral acids such as hydrochloric acid and sulfuric acid. However, when bone is present, the useful acids are restricted to such as phosphoric acid and other acids which do not dissolve bones because mineral acids dissolve components of the bone and the dissolved material may contaminate the finished product. Following a steep in acid solution, the residual acid is removed by rinsing the solid material with water.

Collagen-containing material, subsequent to any steeping or washing treatment is subjected to heating or cooking to solubilize the collagen. Following the cooking operation, insoluble solids are separated from the aqueous extract. The extract containing heat-hydrolyzed proteinaceous material will contain varying amounts of residual sulfite depending upon the amount of sulfurous acid or salts thereof utilized and the type of processing equipment used. The extract will usually have, in 1% solution, a Lovibond color in the range between yellow 1 to 4 and red 0.2 to 1.2 whereas a solution cooked in the absence of sulfite ion will generally show in 1% solution a Lovibond color in the range of yellow 5 to 8 and red 1.6 to 3.0.

Inasmuch as the extracts are dilute solutions, it may be preferable at this stage to effect a partial concentration. Extract solutions are generally concentrated by evaporation of water to a solids content of between 30% and 40% by weight. This preliminary concentrate may have suspended matter removed therefrom, for example, by mixing with filter aid and then filtering the resultant slurry through a precoated filter to obtain a substantially fat and insoluble solids-free solution of non-gelling proteinaceous material.

This extract will also generally contain amounts of sulfite which carry through and are detectable in the finished product unless subsequently eliminated or reduced. It has been found that the sulfite can be reduced to amounts which are not readily detectable in the final product, and at the same time an improvement is effected in the taste and odor of the proteinaceous material by contacting the extract with ion exchange material.

If desired, the extract may be subjected to the action of proteolytic enzymes prior to or after the ion exchange treatment to produce non-darkening, non-gelling proteinaceous products. Extract to be treated with proteolytic enzymes, for example, trypsin, papain and the like, is concentrated and the concentrate adjusted to optimum pH and temperature for the activity of the particular enzyme. After a suitable period, the enzyme treated extract is diluted and the dilute material subjected to ion exchange as hereinafter described. Enzyme treated and ion exchanged extract is concentrated at alkaline pH and the concentrate adjusted to a slightly acid pH with an organic acid prior to sale as a liquid concentrate or drying to produce a powder.

Non-darkening non-gelling proteinaceous products are produced through the removal by ion exchange of whatever elements which upon heating in the absence of an oxidizing agent, may be responsible for development of a darkening color. Suitable anionic exchange materials are those known to the trade as Amberlite, IR–45, IR–402, Rohm and Haas XE–168 and the like. Since anion exchange resin treatment results in removal of acidic ions the solution becomes more alkaline. However, since the pH of the solution at this stage of processing is too high for most applications, it is necessary to lower the pH by suitable means, for example, utilizing acid, preferably phosphoric or citric acid.

Lovibond color readings of solutions entering and leaving the anion exchange resin tower or vessel, when measured at slightly acid pH value, show virtually no change, i.e., if the protein solution is cooked in the absence of sulfite, the solution will generally exhibit a Lovibond color of about 7.0 yellow and 2.5 red prior to passage through an anion exchange column and 7.0 yellow and 2.1 red after passage through the anion exchange column. Proteins cooked in the presence of sulfite ion, on the other hand before ion exchange exhibit a Lovibond color of about 1.5 yellow and 0.5 red and after passage through an anion exchange column exhibit a Lovibond color of about 1.2 yellow and 0.5 red. The relatively insignificant changes in color occurring when protein solutions pass trough an anion exchange column indicates that removal of color bodies per se is not the significant role of the ion exchange material even though a colored eluate is obtained during regeneration of the resin with alkali.

A filtered solution such as that obtained from cooking pigs' feet in the presence of $Ca(HSO_3)_2$ may have a Lovibond color reading at pH 6.0 and at 1% concentration of about 1.2 yellow/0.4 red. After contact with the intermediate base anion exchange resin and adjustment of the solution of pH 6.0, the Lovibond color remains unchanged. Lovibond color readings of solutions of the resin treated material after pH adjustment and drying also remain virtually unchanged from the original color of the solution. A drum-dried product from a filtered solution such as that obtained from cooking pigs' feet in the presence of $Ca(HSO_3)_2$ treated with $H_2O_2$ to destroy the residual sulfite will have a color of about 3.0 Yellow/0.9 Red, as measured in 1% solutions by the Lovibond test.

On the other hand, a solution of product dried using heat, which product was prepared without sulfite, has an even more objectionable color. A solution prepared by cooking pigs' feet in the absence of sulfite will have a color of the order of 7.0 yellow and 2.5 red. After contact with an intermediate base anion exchange resin the color will still be of the order of 7.0 yellow and 2.5 red.

If this solution is bleached to 2.5 yellow and 0.5 red using $H_2O_2$ and excess peroxide eliminated by addition of catalase until a negative response is obtained in the potassium iodide test for peroxide, the product drum dried at about 260° F., will, upon redissolving in water exhibit a color of about 7 yellow and 1.3 red, as measured in 1% solution by the Lovibond test, a color development indicative of failure of the ion exchange resin to remove color precursors which are removable when the cook is in the presence of sulfite ion.

If a low ash product is desired, treatment with various combinations of anionic and cationic resins can be used. The preferred combination for treatment is contact first with an anionic exchange resin of intermediate base strength properties followed by treatment with a strong acid resin such as Amberlite IR–120 H which combination can reduce the ash content of the final product produced from the solution having a 2.16% ash content to approximately 0.03%.

While extract solutions maintained at temperatures above about 45° F. can be passed through the ion exchange beds, it is preferable to effect the ion exchange when the solutions are at a temperature in range between about 150° F. and 200° F. Warm solutions generally are pumped through the ion exchange bed under a pressure of about 25 to 50 pounds gauge.

Contact time of the protein solution with the resin influences the quality of the final product, especially with regard to odor and flavor when the dried product is made up into solutions.

A 40% solution of filtered material obtained by processing pigs' feet is passed through a vessel containing 2 cubic feet of resin at a rate of 1 gallon per minute until the pH of the effluent is 8.5. The pH is then adjusted to 5.5, the product dried, and a sample of the dried product dissolved. The solution has a slight unpleasant odor and a slight bitter taste. When a similar procedure was used, i.e., a procedure differing only in that the material was passed through the resin vessel at a rate of one half gallon per minute, solutions of the dried material are substantially odorless and tasteless.

Dehydrating the aqueous protein solution to produce a dry product having either bland flavor or a light color has been possible heretofore. The problem was to obtain dry products having both properties. If sufficient sulfite or peroxide remained in the solution to prevent color development during drying, then off flavors and odors were evident and if the oxidizers were eliminated color developed. Dehydration of the ion exchanged protein solutions can be carried out in conventional equipment such as drum dryers, spray dryers, and the like, operating in a conventional manner. The protein solutions are generally reduced to powder form under conditions to avoid developing too light a dust, i.e., too small an average particle size. In preparing suitable powdered products, drum dyers usually are operated at speeds of 12 to 20 r.p.m. and at temperatures in the range between 250° F. and 275° F. In preparing spray dried products, a solution of about 25% to 40% solids content is fed to commercial spray dryers operating with an inlet gas temperature generally in the range between about 350° F. and 400° F., although on small dryers inlet gas at temperatures in the range of 440° F. to 500° F. may be used, and with outlet temperatures generally in the range between about 165° F. and 200° F.

In the use of such exchange resins as are referred to above, regeneration is carried out using regenerants and techniques recommended by the resin manufacturer.

In order to more fully illustrate the invention, the following examples are included. These examples are intended to be illustrative only and are not to be construed as limitations on the invention.

Example I

Twenty thousand pounds of ground edible grade hind pigs' feet are cooked using steam at 40 pounds pressure (288° F.) with 2500 gallons of water and 60 pounds anhydrous sodium bisulfite for two hours. The melted fat is drawn off and the liquid phase is decanted from the insoluble residue. The residue is again pressure cooked with 1000 gallons of water and 16 pounds of sodium bisulfite, and the aqueous extract isolated. The aqueous extracts are combined and evaporated to 50% solids. Approximately 5500 pounds of the 50% solids material is obtained.

The concentrated protein solution is then heated to 200° F. and passed through a precoated filter press. One half of the clear solution was dried on a double drum dryer without further treatment. The remaining half was treated with 0.15% hydrogen peroxide and then dried on the drum dryer.

When the water solutions of the untreated and peroxide-treated materials are tasted, the untreated sample has a predominant taste of sulfite whereas the peroxide-treated sample has no sulfite flavor and a slight salty taste. The odor of the solution of untreated sample is much stronger and undesirable than the peroxide-treated sample.

Example II

Eighteen thousand pounds of ground pigs' feet are soaked in cold water for two hours. The water is drained off and the ground feet covered with water a second time and again drained. The feet are then covered with cold water which contains 25 pounds of sulfur dioxide gas, and after steeping the ground feet overnight this solution is drained off. A calcium bisulfite solution is prepared by passing liquid $SO_2$ into a slurry of 27 pounds of calcium carbonate until the solution becomes clear. This solution, plus enough hot water to cover the ground feet, is then added. The material is then cooked with steam at 40 pounds gauge pressure (288° F.) for two hours. After cooking, the melted fat is drawn off, and the aqueous layer is removed. A second cook is carried out with added water at five pounds pressure for one-half hour, the liquid extract removed and combined with the first cook-water extract, and evaporated to 50% solids. Approximately 4800 pounds of the concentrated material is obtained. The material is filtered and split into portions A and B. The portion A was treated with 0.25% of hydrogen peroxide and drum-dried at a temperature of approximately 265° F. The ash content of the dried material is 1.0%. Solutions of the dried material have a slightly bitter taste and some odor. The Lovibond color of 1% solutions is 3.0 yellow and 0.7 red.

Example III

Ten thousand pounds of ground edible grade pigs' feet are cooked using steam at 40 pounds pressure (288° F.) with 1250 gallons of water and 30 pounds of anhydrous sodium bisulfite for three hours. The melted fat is drawn off and the liquid phase is decanted from the insoluble residue. After evaporation approximately 2700 pounds of concentrated solution of 44% solids content is obtained.

The solution having a Lovibond color of 1.2 yellow and 0.5 red is passed through a tower containing approximately four cubic feet of anion exchange resin at a rate of one-half gallon per minute. The pH of the effluent is about 8.6. The effluent is then passed through a tower containing approximately four cubic feet of cationic exchange resin, i.e., the strong acid resin Amberlite IR–120 H. at a rate of one-half gallon per minute. The final solution had an ash content of approximately 0.1%, a pH of approximately 5 and a Lovibond color of about 1.3 yellow and 0.5 red.

The ion exchanged solution was dehydrated in a spray dryer operating with an inlet gas temperature of 375° F. and an air outlet temperature from the drying chamber of approximately 180° F.

A solution of the dried material has a Lovibond color of about 1.4 yellow and 0.5 red and is substantially free of odor and flavor.

EXAMPLE IV

Portion B of the liquid product of Example II which has a pH of 6.0 is passed through a tower containing approximately 2.0 cubic feet of anionic exchange resin (Rohm and Haas IRA–68). After 800 pounds of liquid at 40% solids concentration has passed through the tower at a rate of half gallon per minute, the pH of a composite sample of the effluent is 8.7. The $SO_2$ content in parts per million of $SO_2$ on a solids basis is less than 100. The pH is adjusted to 5.5 with phosphoric acid.

The portion B, after pH adjustment, was dehydrated, on the dryer used to dry portion A, at a temperature of approximately 265° F. A solution of the dried material has a Lovibond color of 1.0 yellow and 0.3 red and is substantially free of odor and flavor.

A typical use for the proteinaceous materials of this invention which have limited gelling character and are substantially free of anions normally present in hydrolyzed proteins is as whipping agent, for example, in confectioneries such as nougat because it renders the mix low in viscosity at relatively low temperatures. Now, for the first time, it is possible to cast nougat at about 135° F. for chocolate shell moulding which will have an excellent nougat texture upon cooling to room temperature.

The following example is illustrative of whipped confectionery prepared with proteinaceous material prepared according to the method of this invention.

EXAMPLE V

Casting nougat was prepared using the product of Example IV as follows:

Casting nougat

Step I (frappe)

Ingredients:
    40 lbs. high conversion corn syrup
    10 lbs. sugar
    18 ozs. product of Example IV (dissolved in 5 pts. water)

Procedure:
    Place solution of product of Example IV and one-half of the high conversion corn syrup in beater and mix (don't beat).
    Cook remaining corn syrup and sugar to 240° F.
    Add and beat for twenty minutes

Step II

Ingredients:
    30 lbs. sugar
    55 lbs. high conversion corn syrup
    3 oz. salt
    1 lb. melted 92° F. vegetable fat
    6 lbs. of the above frappe, color and flavor to suit Procedure:
    Cook sugar, corn syrup and salt to 258° F.
    Stir in frappe, add flavor and fold in vegetable fat Although we have described preferred embodiments of the present invention, it will be understood that the description is intended to be illustrative, rather than restrictive, as details may be modified or changed without departing from the spirit or the scope of the invention.

We claim:

1. A method of preparing light colored water soluble proteinaceous material from hydrolyzed protein obtained through treatment of collagen-containing material with heat and water which comprises heating collagen-containing material in the presence of an aqueous solution, said solution containing sulfite ion in solution in an amount in the range between about 0.1% and about 5% on a weight of collagen-derived protein solids basis, at a temperature in the range between about 250° F. and 350° F. whereby the gel-forming character of the product is at least reduced, treating the resultant aqueous solution with material containing groups capable of an ion exchange and dehydrating the ion exchanged solution using heat.

2. The method according to claim 1 in which the cooking is at a pressure in the range between about 35 pounds and 65 pounds gauge steam pressure corresponding to a temperature in the range between about 275° F. and 310° F. for a period in the range between about 2 hours and about 5 hours.

3. The method according to claim 1 wherein the anion exchange treated material is given a hydrogen ion adjustment to a pH in the range between 4 and 6 and then dehydrated using heat.

4. The method according to claim 1 in which the solution obtained by cooking in the presence of sulfite ion is filtered to remove water insoluble solid matter and is passed while at a temperature in the range between about 150° F. and 200° F. into contact with anion exchange material, the anion exchange solution is contacted with a strong acid cationic exchange resin to adjust the anion exchanged solution to a pH in the range between about 4 and 6 and the effluent solution recovered in the cationic exchange treatment is dehydrated using heat.

5. The method according to claim 1 in which the heating of collagen-containing material is in an aqueous solution containing calcium bisulfite, the resultant aqueous solution is treated with anion exchange resin, the pH of the effluent recovered in the anion exchange treatment is adjusted to approximately 5.5 with phosphoric acid and the resultant solution is dehydrated using heat.

6. A method of preparing light colored water soluble proteinaceous material from hydrolyzed protein obtained through treatment of collagen-containing material with heat and water which comprises heating collagen-containing material in the presence of an aqueous solution, said solution containing sulfite ion in solution in an amount in the range between about 0.1% and about 5% on a weight of collagen-derived protein solids basis, at a temperature in the range between about 250° F. and 350° F. whereby the gel-forming character of the product is at least reduced, contacting the resultant aqueous solution with ion exchange material selected from the group consisting of anion exchange material and both cation and anion exchange material and recovering the proteinaceous product.

References Cited

UNITED STATES PATENTS

| | | | |
|---|---|---|---|
| 398,916 | 3/1889 | Tower | 99—130 |
| 2,240,116 | 4/1941 | Holmes | 260—118 |
| 2,351,718 | 6/1944 | Speakman | 132—7 |
| 2,669,559 | 2/1954 | Reid | 260—112 |
| 2,743,265 | 4/1956 | Garono et al. | 260—118 |
| 2,751,377 | 6/1956 | Keil et al. | 260—118 |
| 2,834,771 | 5/1958 | Mitchell et al. | 260—117 |
| 2,928,822 | 3/1960 | Johnsen et al. | 260—117 |
| 3,108,995 | 10/1963 | Tourtellotte et al. | 260—117 |
| 3,176,001 | 3/1965 | Veis et al. | 260—118 |
| 3,234,199 | 2/1966 | Reid | 260—112 |

OTHER REFERENCES

Danetty et al.: "Advances in Food Research," vol. III, 1951, pp. 272–273.

WILLIAM H. SHORT, Primary Examiner

H. SCHAIN, Assistant Examiner

U.S. Cl. X.R.

99—18, 134; 260—118